United States Patent
Cronmiller et al.

(10) Patent No.: US 9,889,795 B1
(45) Date of Patent: Feb. 13, 2018

(54) SYSTEM FOR CONTROLLING MULTIPLE WARNING DEVICES MOUNTED ON A VEHICLE TO PROVIDE WARNING SIGNALS

(71) Applicant: STAR HEADLIGHT & LANTERN CO., INC., Avon, NY (US)

(72) Inventors: James J. Cronmiller, West Henrietta, NY (US); Stephen T. Vukosic, Avon, NY (US); Andrew Mack, Livonia, NY (US); J. Douglas Richardson, Pittsford, NY (US); Daniel T. McCann, Union, KY (US)

(73) Assignee: STAR HEADLIGHT & LANTERN CO., INC., Avon, NY (US)

( * ) Notice: Subject to any disclaimer, the term of this patent is extended or adjusted under 35 U.S.C. 154(b) by 0 days.

(21) Appl. No.: 14/851,940

(22) Filed: Sep. 11, 2015

(51) Int. Cl.
*B60Q 1/26* (2006.01)
*B60Q 9/00* (2006.01)
(Continued)

(52) U.S. Cl.
CPC ............ *B60Q 9/008* (2013.01); *B60Q 1/2611* (2013.01); *B60Q 1/44* (2013.01); *B60Q 1/52* (2013.01)

(58) Field of Classification Search
CPC . B60Q 1/50; B60Q 1/32; B60Q 9/008; B60Q 1/302; B60Q 1/46; B60Q 1/52; B60Q 1/2611; B60Q 1/38; B60Q 11/007; B60Q 1/486; B60Q 1/28; B60Q 1/2607; B60Q 1/20; B60Q 2400/30; B60Q 11/002;
(Continued)

(56) References Cited

U.S. PATENT DOCUMENTS 5,659,289 A * 8/1997 Zonkoski ............. B60Q 1/2611
340/438
5,736,925 A * 4/1998 Knauff ................... B60Q 11/00
340/463

(Continued)

OTHER PUBLICATIONS

Star Headlight & Lantern Co., Inc., Star Constellation, at least as early as Apr. 10, 2015.

(Continued)

*Primary Examiner* — Anh V La
(74) *Attorney, Agent, or Firm* — Lukacher Law Group; Kenneth J. Lukacher (57) ABSTRACT

A system is provided having a controller for controlling operation of warning devices mounted on a vehicle for providing warning signals directed external of the vehicle. The controller receives one or more vehicle event signals, each indicative of occurrence of a different vehicle event. The controller responsive to receiving each vehicle event signal overrides operation of one or more of the warning devices from a normal operating mode into an override operating mode in accordance with the vehicle event associated with the vehicle event signal being received. In an override operating mode, warning device(s) may provide visual signals to supplement pre-existing vehicular light indicators of vehicle events, while other warning device(s) may be disabled to avoid confusion with such vehicular light indicators. To facilitate ease of connection, each warning device couples to the controller at an output port for receiving power and ground, and control signals from the controller.

24 Claims, 5 Drawing Sheets

(51) Int. Cl.
*B60Q 1/52* (2006.01)
*B60Q 1/44* (2006.01)

(58) Field of Classification Search
CPC .......... B60W 30/14; B60W 2550/402; B60W 2550/408; Y10T 307/74; B60R 1/1207; B60R 1/06
USPC ....... 340/435, 436, 438, 471, 468, 466, 479, 340/472, 475
See application file for complete search history.

(56) References Cited

U.S. PATENT DOCUMENTS

| | | | | |
|---|---|---|---|---|
| 6,031,451 | A * | 2/2000 | Graves | B60Q 1/46 307/10.8 |
| 7,352,278 | B2 * | 4/2008 | Terzian | B60Q 1/302 340/463 |
| 7,551,102 | B1 * | 6/2009 | Carson | B60Q 1/52 340/474 |
| 8,610,556 | B2 * | 12/2013 | Van Neste | B60Q 1/50 340/468 |
| 2009/0309779 | A1 * | 12/2009 | Buckbee | E01C 19/20 341/176 |
| 2010/0085181 | A1 * | 4/2010 | Brooking | B60Q 1/2611 340/468 |

OTHER PUBLICATIONS

Star Headlight & Lantern Co., Inc., Star Constellation, May 26, 2015.
Star Headlight & Lantern Co., Inc., Star Constellation BKLD418 Controller for LED Kits, May 28, 2014.
Star Headlight & Lantern Co., Inc., BKDLXT, Constellation Thinline Auxilliary LED Lights, Aug. 27, 2014.

* cited by examiner

SYSTEM FOR CONTROLLING MULTIPLE WARNING DEVICES MOUNTED ON A VEHICLE TO PROVIDE WARNING SIGNALS

FIELD OF THE INVENTION

The present invention relates to a system (and method) for controlling multiple warning devices mounted on a vehicle to provide warning signals, and particular to, a system for controlling multiple warning devices which provide visual and/or audible warning signals, which can override normal operation of such warning devices responsive to occurrence of one or more vehicle events. Overriding the normal operation of warning devices mounted to a vehicle enhances safety by improving perception of vehicle events, such as braking, turning, hazards, plow up/down, or backing up, thereby reducing the risk of accidents by pedestrians and motorists with such vehicle.

BACKGROUND OF THE INVENTION

Visual warning devices in the form of flashing lamps or rotating beacons, are often mounted in and along exterior of vehicles, typically trucks, so as to provide warning signals in a single color or multiple colors to other motorists on the road. These visual warning devices modify vehicles for use in particular applications, such as construction, emergency services, roadway maintenance, and the like, and are in addition to those typical manufacturer installed (or pre-existing) visual indicator lamps, such as tail lights indicating brake activation, turn signals, and reverse signals. Visual warning devices may be of same or different types, and are typically installed along the exterior body of the vehicle so that motorists are provided with adequate warning along different viewing angles. For example, common locations for mounting visual warning lights are along back, right and left sides of a vehicle, with one or more rotating beacons along the top of the vehicle.

It has also been found that operation of the visual warning devices can interfere with perception by other motorists of typical visual indicator lamps of vehicle operation, such as tail lights when indicating braking or turn signals, causing potential safety risk. For example, an accident can happen when a driver of a car behind a vehicle with such multiple flashing visual warning devices along the rear thereof fails to realize until too late such illumination of tail lights indicating braking due to the driver's mental focus on the flashing visual warning devices. Further, drivers of nearby cars can fail to realize until too late the activation of the turn signals of such vehicle when shifting traffic lanes due to confusion with flashing visual warning devices. Accordingly, it would be desirable to operate such visual warning devices in a manner that enhances perception by others of vehicle events associated with operation of typical visual indicator lamps when activated as well as any other vehicle events to enhance safety in vehicle operation.

Additionally, a trained installer or technician is currently needed to change the operation of visual warning devices mounted on a vehicle. Thus, it would further be desirable to provide a user interface that allows the user of the vehicle to easily select one of different patterns of operation, synchronization, or even output color in the case visual warning devices that having alternative colors or color patterns. Further, it would be desirable if installed visual warning devices enabled high and lower power operation as would be useful for day and night time operation.

SUMMARY OF THE INVENTION

Accordingly, it is an object of the present invention to provide a system for controlling multiple warning devices mounted on a vehicle to provide visual and/or audible warning signals which overrides normal operation of such warning devices responsive to occurrence of one or more vehicle events.

It is another object of the present invention to provide a system for controlling multiple warning devices mounted on a vehicle to provide visual and/or audible warning signals which overrides normal operation of one or more of the warning devices responsive to occurrence of a vehicle event in order to operate such one or more warning devices in a manner that supplements activation of pre-existing vehicular light indicators of the vehicle event, while one or more other warning devices may be disabled to avoid confusion with such vehicular light indicators.

Another object of the present invention is to provide a system for controlling multiple warning devices mounted on a vehicle where each of the warning devices has a cable extending to a connector for mating with one of multiple output ports to facilitate connection to a controller that controls operation of such warning devices in the system.

A further object of the present invention is to provide a system for controlling multiple warning devices mounted on a vehicle having a user interface to a controller of such warning devices that allows a user or installer to control the operation of warning devices, such as selection of the normal mode of each warning device, e.g., flash pattern, rate, and output color (if the warning device has multiple output colors), and synchronization between two or more warning devices, in the case of visual warning devices, and tone selection or mode in the case of audible warning devices, and also override mode operation (or disablement) of one or more warning devices in response to one or more vehicle events.

A still further object of the present invention is to provide a system for controlling multiple warning devices mounted on a vehicle to provide visual warning signals having high and lower power operation that can be selected manually or automatically for day (high ambient light) and night (low ambient light) operation.

Briefly described, a system is provided for controlling warning devices each mounted on a vehicle for providing warning signals directed external of the vehicle, and a controller for controlling operation of each of the warning devices, in which the controller receives one or more vehicle event signals each indicative of occurrence of a different vehicle event. The controller responsive to receiving each of the vehicle event signals overrides operation of one or more of the warning devices from a normal operating mode into an override operating mode in accordance with the vehicle event associated with the vehicle event signal being received.

The override mode for at least one vehicle event operates one or more warning devices to supplement activation of pre-existing vehicular light indicators associated with the vehicle event, and/or disable one or more warning devices to avoid confusion with such pre-existing vehicular light indicators associated with the vehicle event, where such pre-existing vehicular light indicators operate independent of the system. In such an override mode, the controller selectably operates one or more warning devices in a particular flash or non-flash (steady burn) mode for use as auxiliary light(s) which supplement pre-existing vehicular light indicators of a vehicle event. For example, such pre-existing vehicular light indicators of vehicle events may represent a typical tail light indicating vehicle brake activation, or right and/or left turn signal activation. The particular warning device(s) whose normal operation is overridden may depend on the position of the warning device with respect to such pre-existing light indicators on the vehicle. Other warning device(s) may operate unchanged during occurrence of the vehicle event detected by the controller as their position unlikely interferes with perception of pre-existing vehicular light indicators associated with the vehicle event.

The controller sends signals to warning devices to control their operation via a plurality of output ports. Each output port is connected via a connector and cable to each of the warning devices in the system. Such cable for each warning device has control lines, and also power and ground, avoiding the need for separate power and ground connections to be installed directly to each warning device. Control lines are used by the controller to program warning device operation (mode selection and synchronization), and also to start and stop warning device operation in such selected mode and synchronization. Also, input connectors are provided to input lines enabling the controller to receive one or more of the vehicle event signals, where actuation of each of the vehicle event signals occurs independent of operation of the warning devices.

Multiple warning devices in the system provide visual warning signals, where each has one or more light sources for outputting selectable patterns of illumination therefrom in a single color or multiple colors. In addition to such visual warning devices, one or more of the warning devices may provide audible warning signals in selectable tones.

One of the vehicle events may represent up or down status of a plow of the vehicle (if such vehicle has a plow). When such vehicle event is detected, the controller operates one or more warning devices that have dual color visual warning signals in an override mode associated with the vehicle event representing up or down state of a plow. For example such warning devices may provide visual warning signals of blue color when the plow is down in a plow down override mode, rather than amber color when the plow is up.

An optional light sensor may be mounted on the vehicle to provide the controller signals representative of ambient illumination measurement. The controller responsive to the signal(s) from the light sensor may automatically operate the warning devices providing visual warning signals in modes providing one of high or low power states for day (high ambient light) and night (low ambient light) operation, respectively.

A user interface to the controller may be provided enabling a user or installer to select for each warning device: mode of operation (e.g., pattern, rate, color if multiple colors are available, low or high power state, for warning devices providing visual signals, or tone frequency/pattern for warning devices providing audible signals), and synchronization phase of the warning devices providing visual signals with other such warning devices. The user interface may further enable selection of override mode operation of warning devices in response to one or more of the vehicle events. For example, such user interface may be a touch screen within the vehicle (or a computer or other programmable device interfaced with the controller), and/or switches or buttons accessible via, or upon, a housing containing the controller of the system.

A method is also provided for controlling warning devices mounted on a vehicle comprising the steps of: mounting a plurality of warning devices along a vehicle for providing warning signals directed external of the vehicle; controlling operation of each of the plurality of warning devices; receiving one or more vehicle event signals each indicative of occurrence of one of a plurality of different vehicle events; and overriding operation of one or more of the warning devices responsive to receiving each of the vehicle event signals from a normal operating mode into an override operating mode in accordance with the vehicle event associated with the vehicle event signal being received.

BRIEF DESCRIPTION OF THE DRAWINGS

The foregoing and other objects, features and advantages of the invention will become more apparent from a reading of the following description in connection with the accompanying drawings in which.

DETAILED DESCRIPTION OF THE INVENTION

Figure 1:
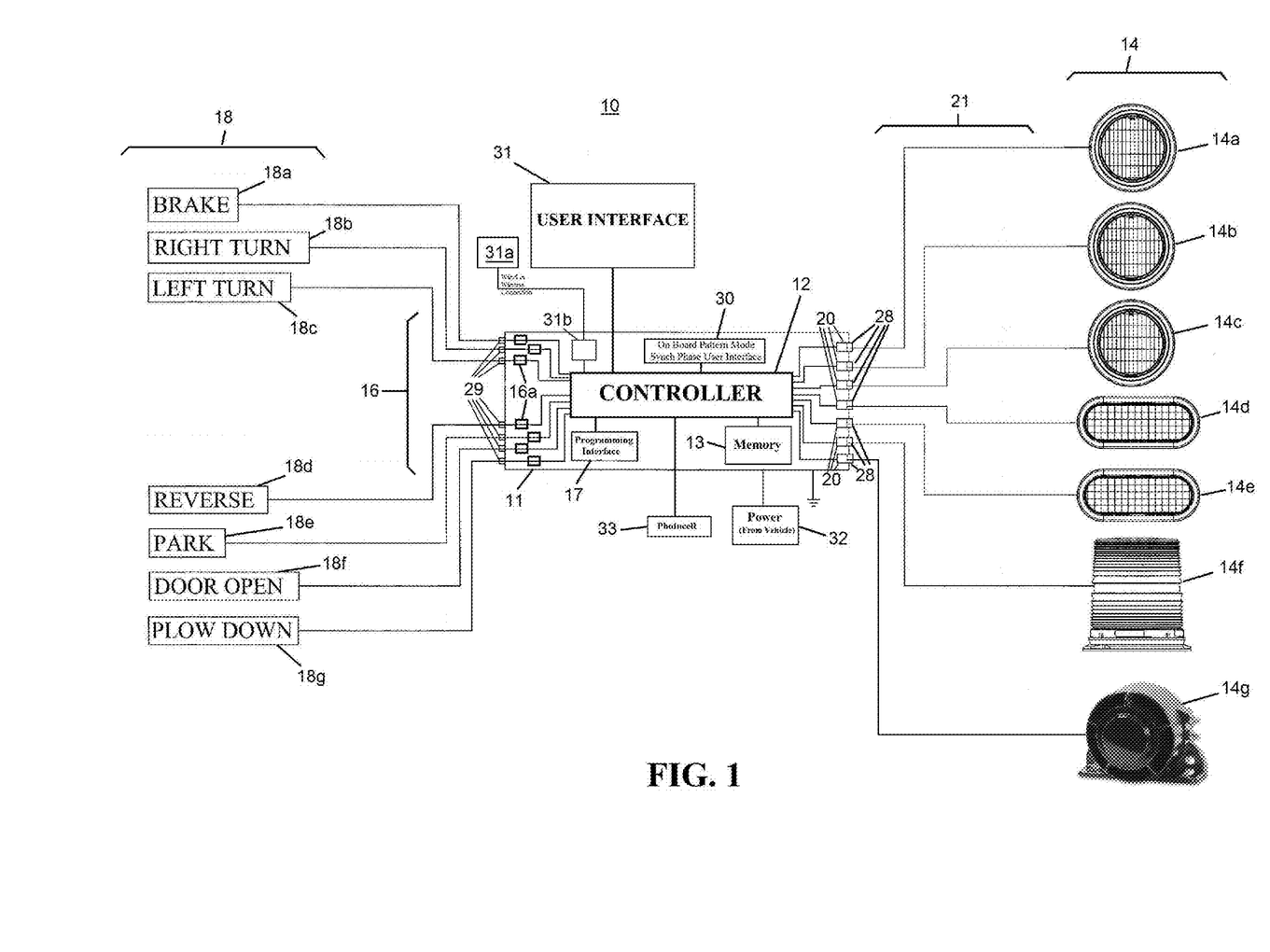
FIG. 1 is a block diagram of the system of the present invention for controlling multiple warning devices mounted on a vehicle to provide warning signals.

Referring to FIG. 1, a block diagram of the system 10 of the present invention is shown having a controller 12 for controlling the operation of multiple warning devices 14 each providing visual or audible warning signals. The controller 12 receives electrical signals along input lines 16 representative of different vehicle events 18 from a vehicle having such warning devices 14. Controller 12 is a programmable device, such as a microcontroller or microprocessor, and operates system 10 in accordance with a program (or software) stored in memory of the controller 12, such as non-volatile memory, or stored in optional memory 13 accessible to the controller. Warning devices 14 are linked to controller 12 via output ports 20, where each warning device 14 has a cable 21 which extends to a connector (or plug) 28 configured to mate with one of output ports 20. Signals along input lines 16 representative of different vehicle events 18 are received by controller 12 via input connectors 29. The controller 12 is preferably in a housing 11 mounted on a printed circuit board along with other components, where housing 11 has opening(s) through which output ports 20 and input connectors 29 extend or are accessible for coupling with connectors 28 and lines 16, respectively. Such printed circuit board 34 is shown for example in FIG. 3. Although preferably multiple input connectors 29 are provided, the system may have a single input connector 29 using a single line 16 associated with one of vehicle events 18 as desired.

Warning devices 14 providing visual warning signals ("visual warning devices") have light(s) or lamp(s) with one or multiple sources, such as LEDs or bulbs, and different selectable modes of operation in terms of flash illumination and flash rates. One of such modes can optionally include non-flashing on state (e.g., steady burn). Depending on the particular visual warning device, output illumination color may be monocolor or selectable between modes of different colors of output illumination. Typical colors of illumination, are red, white, amber, green, or blue. For example, visual warning devices with multiple colors may have different color light sources. Further additional modes are optionally provided enabling each visual warning device to have high power and low power states for selectable day and night (or low ambient light) time operation, respectively.

Warning devices 14 providing audible warning signals ("audible warning devices") have a speaker providing a sound alarm which has different selectable modes of operation in terms of tone frequency, pattern and/or rate. For example, an audible warning device may be a backup alarm mounted along the rear of a vehicle which is activated when a vehicle is backing up or traveling in reverse gear. Optionally, an audible warning device may also incorporate a visual warning device such as described above. Other types of audible warning device may be provided for warning device 14g, or an additional audible warning device, such as a siren mounted on the vehicle.

Figure 2:
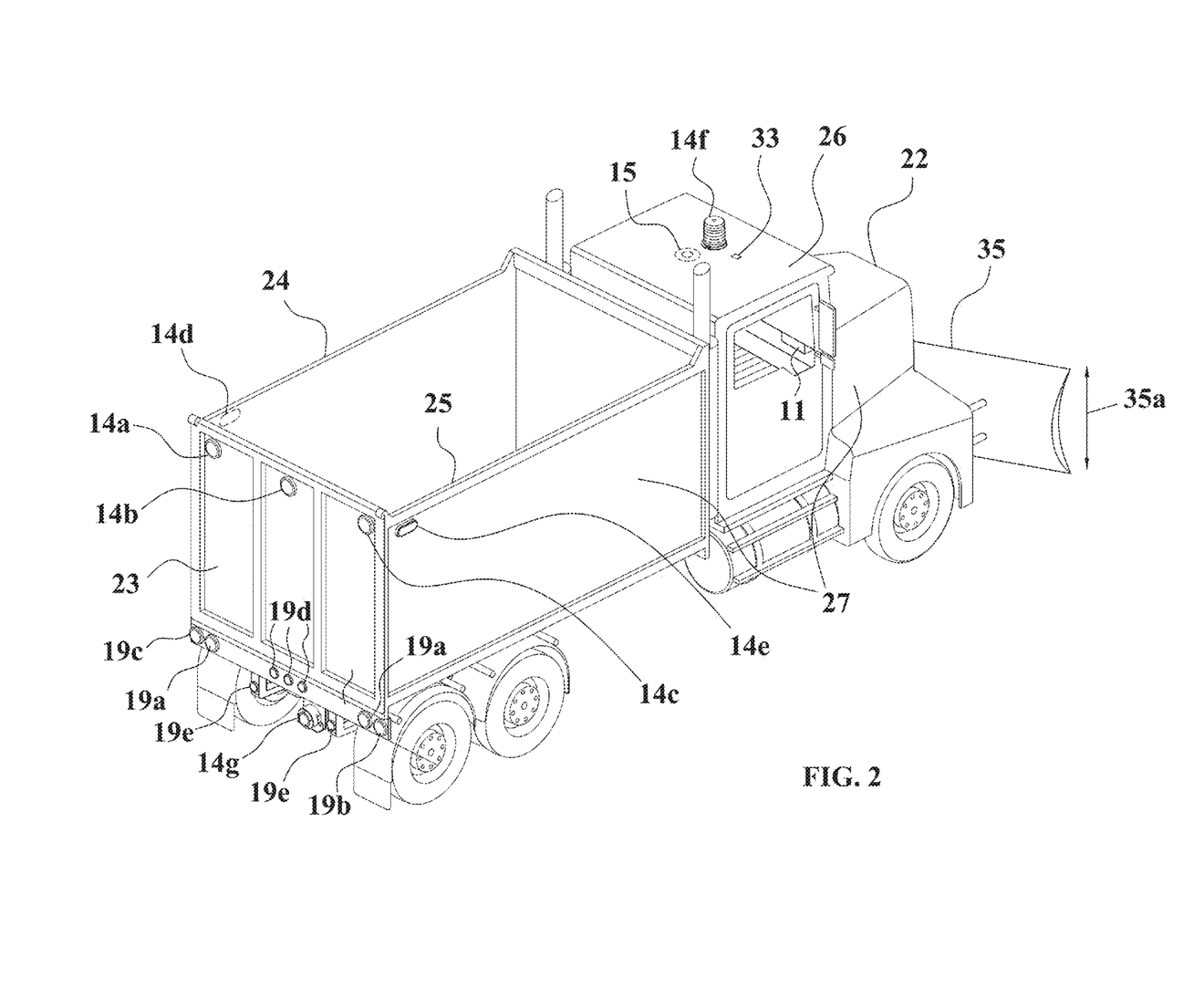
FIG. 2 is an example of a vehicle incorporating the system of FIG. 1.

For purposes of illustrating system 10, an example of six visual warning devices 14a, 14b, 14c, 14d, 14e, and 14f, and one audible warning device 14g are shown in FIG. 1 coupled to controller 12, and in FIG. 2 mounted on a vehicle 22. Visual warning devices 14a-e represent LED lamps in round and oval configurations as depicted, and visual warning device 14f is a beacon type light with rotating or flashing output illumination. System 10 can have visual and audible warning devices of the same or different models or types installed along a vehicle as desired, and are not limited to those shown in FIGS. 1 and 2. While vehicle 22 is shown as a truck, other types of trucks or vehicles may have mounted warning devices 14 for use with system 10 with lights or lamps 19a-e of different type and/or location on the vehicle than shown in FIG. 2. Further, system 10 may include visual warning devices without any audible warning devices, and vice versa.

In the FIG. 2 example, warning devices 14a-c are mounted along the rear 23 of the body 27 of vehicle 22, and warning devices 14d and 14e are mounted along the left and right sides 24 and 25, respectively, of body 27 of vehicle 22. Other typical manner of mounting may be used than on-surface mounting of visual warning devices shown in FIG. 2, such as inset mounting with a ring or grommet in an opening cut in body 27. Warning device 14f is shown in FIG. 2 mounted on the roof 26 of vehicle 22, such as by a magnet, suction, or bolts, and audible warning device 14g represents a backup alarm as typically mounted along the rear 23 of vehicle 22, such as along its rear frame. Other configurations, number, and types of warning devices 14, and mounting locations may be used than shown. The number of warning devices controllable by controller 12 depends on the number of output ports 20 available. Each warning device 14a-f is installed with respect to body 27 of vehicle 22 with drilled/cut opening(s) in accordance with manufacturer's specification for the warning device, so that a cable 21 extends from the warning device within body 27, such as in spaces or cavities which may already be used with other vehicle wiring, to connect to connectors 28 mated with output ports 20 along housing 11. Such housing 11 may be mounted by screws or other mounting mechanism under the dashboard in vehicle 22, or other area along vehicle 22, such as a storage or truck compartment, as desired. Cables 21 are of such length to enable connection at one end to their respective mounted warning devices 14 and at their other end to output ports 20, via connectors 28.

Other warning devices 14 than shown that may be used, include, but not limited to a light bar mounted on the roof 26, or a visual warning device within a vehicle mounted for sending illumination through a vehicle window. Also, one or more warning devices 14 may be mounted along the front of the vehicle 22. In this manner, controller 12 can be connected to different warning devices 14 as desired to be installed along any vehicle.

In the example of warning devices 14 shown in FIGS. 1 and 2, warning devices 14a-g depicted are manufactured by Star Headlight and Lantern, Inc. of Avon, N.Y., where warning devices 14a-14e are LED lamps models DLXTHR and DLHTHR in round, and DLXTHU and DLHTHU in oval, configurations, warning device 14f is a single or dual color Star Halo beacon, and warning device 14g is a Star Spectrum backup alarm. Each of the warning devices 14a-14e has multiple selectable flash pattern modes including steady burn, and programmable Star S-Link synchronization with each other. Warning devices 14 by other manufacturers may also be used which can similarly link to controller 12.

A user interface 30 to controller 12 is provided for enabling selection of mode of operation of each of warning device 14 and warning devices 14 synchronization. User interface 30 is along housing 11, or accessible by removal of a top cover of such housing 11, and has jumpers, switches, pins, keys, and/or buttons enabling an installer for each output port 20 (1 to N, e.g., N=7 in FIG. 1) to input a numeric code (or other identifier) associated with the particular warning device 14 connected to such port, select a mode of operation of the warning device, and select desired phase of synchronization of the particular warning device 14 to operate (e.g., flash) in unison (same phase as another device 14) or alternate (opposite phase as another device 14), or to disable/enable the warning device. Memory of controller 12 or accessible memory 13 stores a database or list of codes or other identifier of each warning device 14 that can be utilized in system 10 to lookup warning device information, such as programming modes, and protocols for programming the electronics of each warning device 14 in terms of signals on control line(s) present in cable 21 to the warning device. For example, the selectable mode for a particular device 14 may be associated with a number (1 to M) entered via user interface 30, where different models or types of device 14 will have different number M of modes available. An example of user interface 30 is described later in connection with FIG. 3.

Another user interface 31 is preferably provided with the same programming functionality as user interface 30, but is a touch screen display with a graphical user interface provided by controller 12 software with one or more screens enabling user interaction. Such user interface 31 also may be provided by application software operating on a computer or other programmable device 31a, such as a personal computer, tablet, laptop, smart phone, or handheld programmable device, which interfaces with controller 12 via a cable to an optional wired (e.g., USB) and/or wireless (e.g., RF or Bluetooth) interface 31b in FIG. 1. For example, the user interface 31 may have a setup mode enabling a user to input the particular warning device (such as via a pull down menu) associated with each port 20, and then for each warning device so selected displays the available modes of its operation, e.g., flash, rate, color, audible tone frequency, and/or sync phase, depending on each warning device's functionality and manufacturer specification. The controller 12 stores in its memory or memory 13 the warning device information inputted for each of ports 20, including at least the code or identifier associated with the warning device, the mode selected (if no mode is selected then a default mode is used), and synchronization selected (if any). Such is used by the controller 12 to reset the system 10 if needed, or to display current settings for system 10 on user interface 31. Alternatively, only one of user interface 30 and 31 need be provided in system 10. Further, user interface 30 and 31 may enable a testing mode during setup of one or more of warning devices 14 during or after programming is completed to assure each operate as desired, until desired setup is completed. User interface 31 in the case of a touch screen is preferably located near the driver of the vehicle, such as mounted onto or within a dashboard of vehicle 22, as typical of display console mountable screens in vehicles.

After setup is complete, user interface 31 enables the user to view current settings for warning devices 14 in system 10 and edit such settings in one or more screens, and thereby setup or change operation of the warning devices 14. For example, for each warning device 14 in system 10, the user via user interface 31 can enable or disable operation of the warning device, select mode of operation each of the warning devices, as described earlier, synchronization, and enable high power or low power operation if manually settable. Preferably, the user interface 31 does not allow the user to turn off function of audible warning device 14g that serves as a backup alarm, as such is always active as a safety precaution, but such may be disabled via user interface 30 if desired. The controller 12 is programmed to operate responsive to instructions received via the user interface 31 as typical of a graphical user interface. Although a touch screen is preferred for user interface 31, other types of user interfaces may be provided with LED/LCD screen, switches, touch pad, and/or buttons to enable same functionality.

Preferably, each warning device 14 has electronics responsive to two control lines (wires), which are connected to controller 12 via cable 21, connector 28, and output port 20. However, other number of control lines may be utilized as desired to interface controller 12 with warning devices 14. Control lines are used by controller 12 to program warning device operation (mode selection and synchronization, if any), and also to start and stop warning device operation in such selected mode and synchronization. The protocol or signals used by controller 12 for programming and starting and stopping operation along control lines depends on the manufacturer specification for device, as controller 12 is designed to work with different types of warning devices mountable along vehicle 22. If any of warning devices 14 used lack programmable mode selectability, controller 12 may then send start and stop signals to provide desired warning signal output from the warning device in accordance with stored timing patterns in memory of the controller 12 or memory 13, which may be selected by the user via user interface 30 and/or 31.

In addition to control lines, a ground line (wire) and power line (wire) is provided in cable 21 to each warning device 14 via output port 20 and connector 28. Power line may be 12 volts DC as provided from a power 32 connection to the battery of vehicle 22. Controller 12 and other electronics in housing 11 upon printed circuit board 34 (FIG. 3) are also connected to ground and power, where power 32 is converted into a usage level for the controller and such electronics. A programming interface connector 17 is accessible via an opening in housing 11. Programming interface connector 17 enables an external computer system (not shown) to communicate via a cable with a connector which mates to controller 12, so as to download or update the program in memory of controller 12 (and/or optional memory 13) as needed during manufacture or version updates, as typical with programmable logic devices, such as microcontrollers or microprocessors.

Optionally, controller 12 also receives signal(s) from a light sensor 33, such as photocell, mounted along the vehicle 22, such as shown for example in FIG. 2, providing the controller 12 a measurement or level of the amount of ambient light. For example, such photocell may be a Vactec model VT80F144, but other photocell or light sensor may be used. The controller 12 may operate responsive to signal(s) from the light sensor 33, such that if a received ambient light level is below a minimum ambient light threshold stored in memory of the controller 12 or memory 13, controller 12 operates warning lights 14a-f which provide visual signals at their respective modes in low power to facilitate night (or low ambient light condition), and otherwise at high power so as to facilitate day (or high ambient light condition). Controller 12 may switch modes of visual warning devices 14a-f automatically between low and high power states responsive to signal(s) from light sensor 33 when visual warning devices 14a-f are active. User interface 30 and/or 31 may provide at least one screen, button, or switch, which can enable or disable such automatic low and high power switching.

The controller 12 is connected to receive along input lines (or wires) 16 the following vehicle event signals 18: brake activation 18a, right turn signal activation 18b, left turn signal activation 18c, reverse gear shift 18d, park gear shift 18e, and door open activation 18f. This is achieved by coupling each input line 16, such as by splicing, into the existing wire in the vehicle 22 that supplies power to a pre-existing vehicle lamp activated by the event, where such input line 16 then connects to a controller 12 input port via connector 29. Circuitry 16a may be provided along each input line 16 for conditioning a received signal for use by controller 12. Such circuitry 16a may convert received signal(s) into a voltage level detectable at one of the digital input ports of controller 12 when the signal is present indicative of the detected vehicle event, such by passing the signal through a voltage divider circuit, and/or other analog to digital conversion circuitry. For brake activation 18a, its input line 16 is connected to the power supply wire of one of the vehicle tail light 19a (FIG. 2) that brighten when the brake of vehicle 22 is pressed. For right and left turn signal activations 18b and 18c, each has an input line 16 connected to the power supply line to one of the right and left turn signal lamps 19b and 19c (FIG. 2), respectively. For reverse gear shift 18d, an input line 16 is connected to the power supply wire of one of the reverse lights 19d (FIG. 2). For park gear shift 18e, an input line 16 is connected to the power supply wire of one of the park lights 19e (FIG. 2). For door open 18f, an input line 16 is connected to the power supply wire of an interior dome light 15 (FIG. 2). Thus, when the vehicle supplies power to the light associated with one of vehicle event signals 18a-f, the input line 16 from the lamp associated with such event provides a vehicle event signal along such input line to the controller 12 via their respective input connectors 29. Accordingly, actuation vehicle event signals along input line 16 occurs independent of operation of the warning devices 14.

Other vehicle events may similar be received by the controller 12, such as plow down 18g state, in the case of vehicle 22 having a plow 35 (FIG. 2) movable between up and down positions as indicated by arrow 35a. The input line 16 for plow down 18g state may be provided by an input line 16 coupled to the power line of a status indicator light of plow position in the vehicle typically present near the driver, in the same manner as other input lines 16. Alternatively, the input line 16 for plow down 18g may be connected to a button/switch in the vehicle, which the driver presses or switches when his plow is down, to send a vehicle event signal of plow down 18g to controller 12. Other vehicle event signals may similarly be generated, where the number of vehicle event signals receivable by controller 12 depends on the number of input connectors 29 available.

Figure 3:
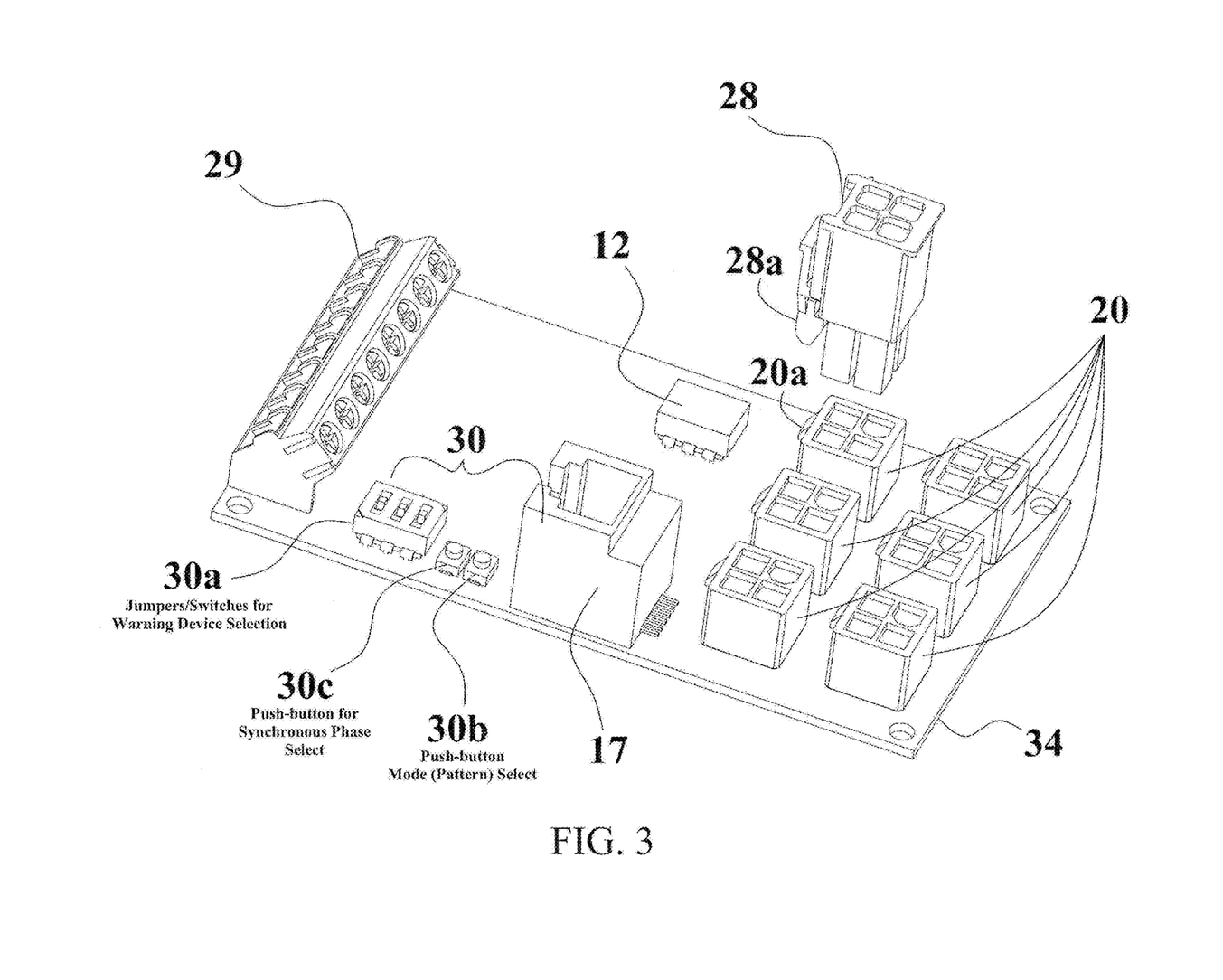
FIG. 3 is a perspective view of an example of a printed circuit board having the controller of FIG. 1 and other components of the system.

Referring to FIG. 3, an example of a printed circuit board 34 is shown with controller 12, output ports 20 to warning devices 14, connectors 29 without input lines 16, programming interface connector 17, and user interface 30. For purposes of illustration, only one connector 28 is shown in FIG. 3 without its associated cable 21, and wiring along printed circuit board 34 is not shown. Each connector 28 has a releasable latch member 28a to a catch 20a along each port 20 so as to retain four prongs of connector 28 mated with four individual ports of each port 20 in an electrical connecting relationship (e.g., for power, ground, and two control signal lines). Other mechanism for releasable latching connectors 29 to ports 20 and their mating configuration may be used than shown. In the example of user interface 30 to controller 12, jumper or switches 30a are provided to select which of the warning devices 14 are to be programmed (1 to N, e.g., N=7 in FIG. 1), and push button 30b so that button is pressed equal to the number assigned to the desired mode (1 to M) as per the specification for that selected warning device 14. In the case of a visual warning light devices 14a-f, modes can differ from each other in terms of flash illumination and flash rates, output color when having different color or color patterns, and high power and low power states if provided. In the case of audible warning devices or combined audible visual warning devices, modes can differ from each other in terms of tone frequency and/or rate as per the specification for the particular warning device 14. If no mode is selected, a default mode is used by the electronics of warning device 14 also in accordance with manufacturer specification for each particular warning device 14.

As identification of each warning device to controller 12 is not provided in the example of user interface 30 of FIG. 3, the code or identifier of the warning devices 14 connected to such port is manually entered using interface 31 as described earlier. However, rather than manual entry, one or more of the control lines to warning device 14 may optionally have input and output functionality, enabling the electronics of each warning device 14, in response to a controller 12 sent query or handshake signal or message, respond with information or data along such line(s) representing a code or identifier associated with warning device 14 by which controller 12 can associate with in a look-up table in memory of the controller or memory 13 to determine the warning devices 14 coupled to each of the ports 20, and hence its modes and programming protocol for mode and synch selection. When only user interface 30 is provided in system 10, user interface 31 may represents a button or switch to turn on and off operation of system 10.

Push button 30c enables synchronous mode selection of the selected warning device 14, so that button is pressed equal to a synch phase number in accordance with the specification of the particular warning device 14, such as operate (e.g., flash) in unison (same phase as another device 14) or alternate (opposite phase as another device 14). In operation, preferably one of the control lines to the warning devices 14 changes state (high to low, or low to high) to indicate when to start (on) and stop (off) warning light operation in its desired mode. In this manner, the controller 12 by sending a start signal at the same time to two or more devices that are set to modes sharing a common rate of flash or audible operation will operate in unison (same phase). While alternating start and stop signals between two warning devices 14, alternate operation of such devices (opposite phase from one another). Further, maintaining such start and stop operation of a control line in a stop (off) state, the controller 12 can disable a warning device 14 from operating. Optionally, maintaining such start and stop operation of a control line in a start (on) state may have the warning device 14 illumination in steady burn mode.

Once the warning devices 14 are programmed to their respective mode and optional synchronization, they operate in such mode whenever enabled by controller 12, referred herein as normal operating mode. Responsive to detection of any one of vehicle events 18, controller 12 exits normal operating mode and operates one or more of warning devices 14 in an override mode in accordance with such vehicle event detected, as will be described below. In order to properly operate warning devices 14 in override modes, the controller 12 has positional information associating warning devices 14 within their respective location of mounting on vehicle 22. In one embodiment, particular ones of ports 20 are connected to warning devices 14 mounted at particular locations along the vehicle 22, thereby providing such positional information. For example, warning device 14a is connected to a first output port 20 associated with rear left vehicle location, warning device 14b is connected to a second output port 20 associated with rear center vehicle location, warning device 14c is connected to a third output port 20 associated with rear right vehicle location, and so forth. In another embodiment, the user can associate ports 20 with locations of warning devices 14 in one or more screens along user interface 31, so as to obtain positional information associating visual warning light devices 14 with their vehicle location.

The override modes are stored in memory of controller 12 or in memory 13 as part of the program operating system 10. However, a user or installer via one or more screens on user interface 31 may optionally configure a particular response by controller 12 in terms of override mode operation of one or more warning devices 14 and disabling other one or more warning devices 14 to any one of the vehicle events 18 detected by controller 12, as well an override mode responsive to two or more vehicle events being detected at the same time. The setting of a user or installer configured operating mode are stored in memory of controller 12 or memory 13, and will supersede those stored previously for responding to the same vehicle event(s) 18.

Figure 4A:
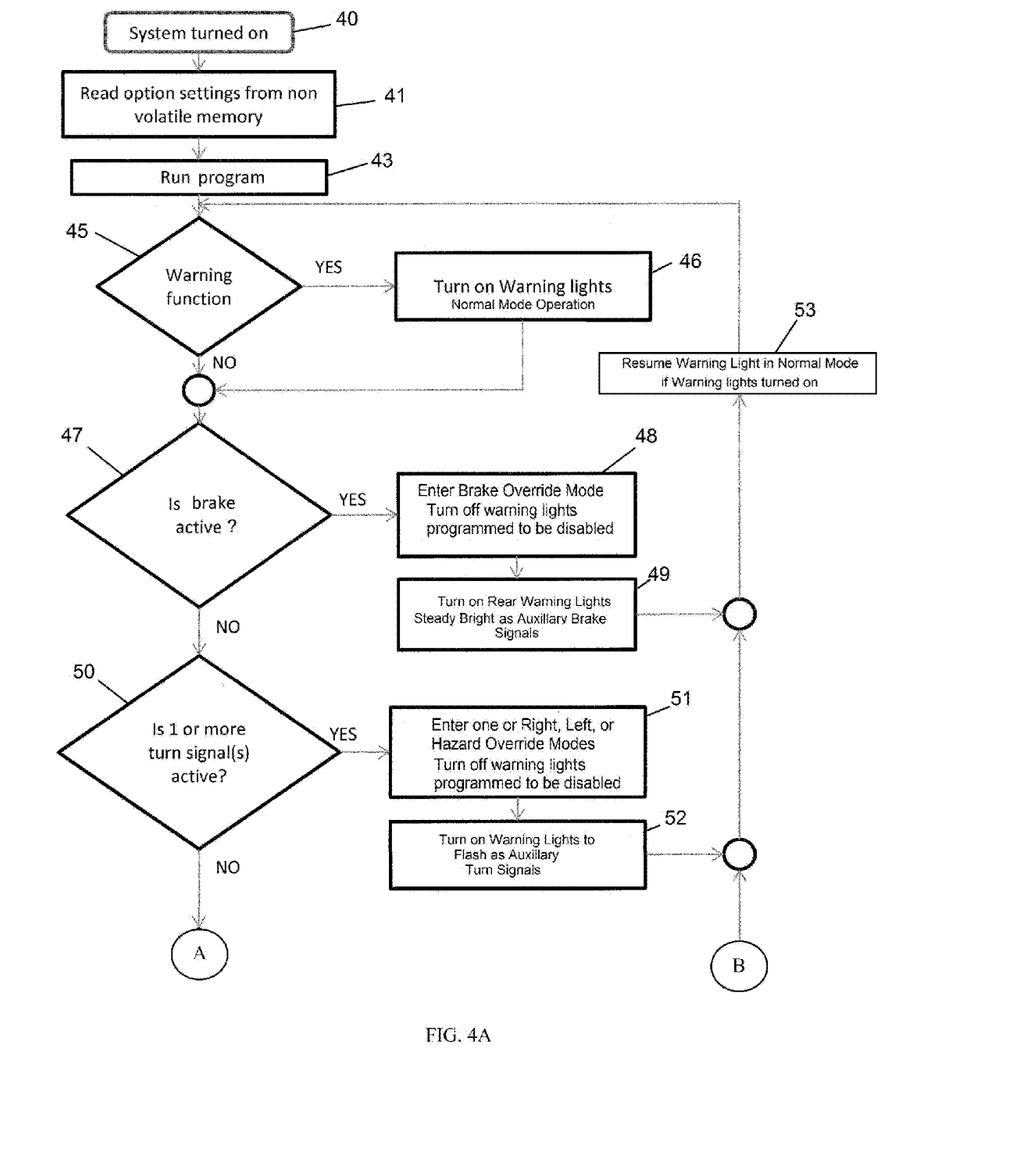
FIGS. 4A and 4B is a connected flow chart showing the operation of the system of FIG. 1 where connection between FIGS. 4A and 4B are denoted by circled letters.
Figure 4B:
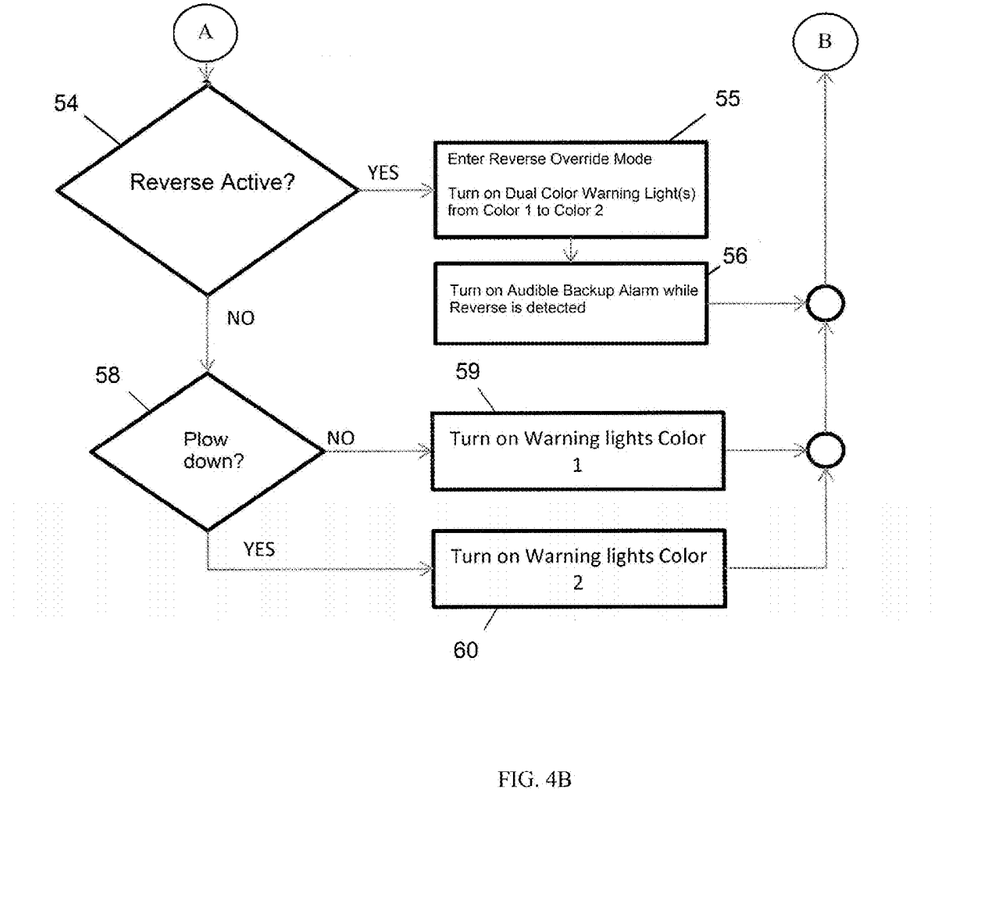

Referring to FIGS. 4A and 4B, the operation of system 10 is shown. If system 10 is not already on, system 10 turns on at step 40, such as in response to supplied power. At step 41, controller 12 reads stored settings from memory of controller 12 (or in memory 13) of any stored override mode(s) which may have been entered via user interface 31. Controller 12 then reads from its memory and/or memory 13 its program for operating system 10 (step 43). The output ports 20 are associated with particular warning devices 14 using positional information as described earlier, so that controller 12 can send control signals to proper visual warning devices 14a-f and also to audible warning device 14g in normal mode and in override modes. Controller 12 checks at step 45 whether the user has activated or turned on visual warning devices 14a-f of system 10 (step 45), such as by pressing a switch, button, or screen icon on a touch screen of user interface 31. If no user interface 31 is present in form of a touch screen or the like, a button or switch placed within the vehicle 22 may serve as user interface 31 for purpose of turning on and off normal mode operation of visual warning devices 14*a-f* of system 10. If the user has turned on the visual warning devices 14*a-f*, controller 12 responds by operating visual warning devices 14*a-f* in their normal operating mode (step 46) by sending on their control line(s) such signal(s) to operate with desired synchronization setting, if any. As stated earlier, actuation of the vehicle event signals occur independent of operation of the warning devices, thus vehicle event signals to controller 12 (i.e., as described below in steps 47-52 and 54-60 resulting in override modes) are independent of visual warning devices 14*a-f* operation responsive to user actuation steps 45-46.

The controller 12 checks at step 47 for a vehicle event signal from input line 16 for brake activation 18*a*. If received, controller 12 then exits normal mode and enters brake override mode in which preselected ones of visual warning devices 14*a-f* providing visual warnings are turned off by the controller 12 while the input line 16 for brake activation signal 18*a* is being received, while other visual warning devices enter a steady on state (steps 48-49). In the example of FIG. 2 for brake override mode, warning devices 14*d* and 14*e* are turned off (step 48), while warning devices 14*a*, 14*b*, and 14*c* are programmed by controller 12 to their steady on mode (step 49). For example, warning devices 14*a*, 14*b*, and 14*c* may be readily reprogrammed to their steady on mode, or a signal may be sent to each of warning devices 14*a-c* along their control lines for start and stop signals, which instead of high (1) or low (0) voltage signals, floats at a voltage level there between which when detected by electronics of each warning devices 14*a-c*, automatically enters the warning device into a steady on state mode. Thus, warning devices 14*a-c* serve as auxiliary or supplemental brake visual signals increasing the perception to other motorists on the road that braking of vehicle 22 is occurring. When the brake actuation 18*a* signal along input line 16 is no longer detected by controller 12, brake override mode of steps 48-49 exits and controller 12 resumes operation of warning devices 14 in normal mode if activated at steps 45-46 (step 53) and then returns to step 45. Note that regardless of whether visual warning light devices 14*a-f* have been activated at steps 45-46, controller 12 may operate warning devices 14*a-c* as auxiliary or supplemental brakes lights while vehicle actual tail light 19*a* is illuminated to indicate braking of vehicle 22.

If at step 46, the vehicle event signal from input line 16 for brake activation 18*a* was not detected by controller 12, then at step 50 the controller 12 checks if the vehicle event signal(s) from input line(s) 16 has been detected for right turn signal activation 18*b* and/or left turn signal activation 18*c*. If so, controller 12 exits normal mode and enters right turn signal override mode if the input line 16 for right turn signal activation 18*b* is activated, or left turn signal override mode for left turn signal activation 18*c* is activated, or hazard override mode if both right and left turn signal 18*b* and 18*c* are activated (steps 51-52). As the input line 16 to the right or left turn signal lamps 19*b* and 19*c* will be periodic when active as such turn signals commonly flash, controller 12 detects this when entering the right or left turn signal override modes.

In right turn signal override mode, such visual warning devices turned off when right turn signal activation 18*b* is detected include warning devices 14*a*,14*b*, and 14*d* (step 51), while warning devices 14*c* and 14*e* are turned on when a signal is being received along the right turn activation 18*b* input line 16 (step 52). Thus, warning devices 14*c* and 14*e* will flash in synch as the right turn signal lamp 19*b* flashes, enabling warning devices 14*c* and 14*e* to serve as auxiliary or supplemental right turn signals enhancing perception by drivers of other vehicles of the vehicle 22 imminent right turn or lane change.

In left turn signal override mode, such visual warning devices turned off when left turn signal activation 18*c* is detected include warning devices 14*c*, 14*b*, and 14*e* (step 51), while warning devices 14*a* and 14*d* are turned on when an input signal is being received along the left turn activation 18*c* input line 16 (step 52). Thus, warning devices 14*a* and 14*d* will operate in synch as the left turn signal lamp flashes, enabling warning devices 14*a* and 14*d* to serve as auxiliary or supplemental left turn signals enhancing perception by drivers of other vehicles of the vehicle 22 imminent left turn or lane change.

In hazard override mode, no visual warning devices are turned off at step 51, and visual warning devices 14*a*, 14*b*, 14*c*, 14*d*, and 14*e* are turned on when an input signal is being received along inputs lines 16 for left and right turn activation 18*c* and 18*b* (step 52). Thus visual warning devices 14*a*, 14*b*, 14*c*, 14*d*, and 14*e* are operated in synch as lamps 19*b* and 19*c* flash, enabling warning devices 14*a*, 14*b*, 14*c*, 14*d*, and 14*e* to serve as auxiliary or supplemental hazard signals.

When the periodic input signal 16 for right turn signal activation 18*b* or left turn signal activation 18*c* is no longer detected after a period of time indicating such turn signal lamps 19*b* or 19*c*, respectively, are no longer active, such as 5 seconds, the override mode is exited and controller 12 resumes operation of warning devices 14 in normal mode (step 53) if warning lights were activated at steps 45-46. Note that regardless of whether warning lights have been activated at step 45-46, controller 12 operates selected warning devices as auxiliary or supplemental right or left turn signals while such turn signals 19*b* and 19*c*, respectively, are active. Less preferably, override modes at steps 48-49 and 51-52 are not activated until visual warning devices 14*a-f* are turned on at steps 45-46.

If at step 50, no vehicle event signal along input lines 16 for right or left turn signal activation 18*b* and 18*c* were detected by controller 12, then at step 54 the controller 12 checks if a vehicle event signal from input line 16 has been detected for reverse activation 18*d*. If received, controller 12 then exits normal mode and enters reverse override mode in which preselected one(s) of visual warning devices 14*a-f* providing two color operation are switched by controller 12 to operate from first color mode to their second color mode, such as in clear steady burn mode (step 55), and controller 12 activates audible warning device 14*g* (step 56) (as well as any visual warning device which may be incorporated in device 14*g*) to provide backup warning signals, while the input line 16 for reverse activation 18*d* is being received. When the input signal along input line 16 for reverse actuation 18*d* is no longer detected indicating such reverse signal lamps 19*d* are no longer active, audible warning device 14*g* is turned off by controller 12 and controller 12 exits the override mode and resumes operation of warning devices 14 in normal mode (step 53) if warning lights were activated at steps 45-46.

If at step 54, no vehicle event signal along input line 16 for reverse activation 18*d* was detected by controller 12, then at step 58 the controller 12 checks if a vehicle event signal from input line 16 has been detected for plow down signal activation 18*g* if vehicle 22 has a plow 35 movable between up and down positions. If so, controller 12 maintains normal mode but in a plow down override state in which one or more of visual warning devices having two color operation are switched by controller 12 to operate in a second color mode, such as blue (step 58), indicating that the plow 35 is down, rather than their first color mode, such as amber, indicating that the plow 35 is up. After step 59, controller 12 returns to step 53 in which visual warning devices 14a-f are in normal mode operation with such dual color visual warning devices at that plow down color. When the plow down signal activation 18g is no longer detected at step 58, the normal mode exits plow down override mode and returns to the plow up state and such one or more visual warning devices which had been switched by controller 12 to the second color are switched back by the controller to their first color (step 60). After step 60, controller 12 returns to step 53. If no plow is present on vehicle 22, then steps 58-60 are skipped.

Controller 12 similarly can enter override modes responsive vehicle event signal for input line 16 to park activation actuation 18e or door open activation 18f, and enter an override mode to change operation of visual warning devices 14a-f and/or audible warning device 14g, as desired. For example, where audible warning device 14g is a siren which has been activated by controller 12, when a door open activation 18f is detected by controller 12 the entered door open override mode disables audible warning device 14g to protect operator's ears when exiting the vehicle. The override mode with respect to warning device 14g continues until the operator re-enters the vehicle and selects via user interface 31 to resume normal operation of all warning devices 14 or warning device 14g, as desired.

The vehicle events 18 should not be limited to those described herein, other vehicle events may similarly be detected by controller 12 as desired by the installer or user of system 10 to temporarily override normal operation of one or more of warning devices 14 as desired. Further less than all of the above described vehicle events 18 may be provided to controller 12 in system 10. For example, some vehicles such as used in construction may not have park lights 19e and/or reverse lights 19d, and if so, their respective vehicle events 18e and/or 18d would not be part of system 10.

From the foregoing description it will be apparent and has been provided an improved system and method for controlling multiple warning devices mounted on a vehicle to provide warning signals. Variations and modifications in the herein described system and method will undoubtedly suggest themselves to those skilled in the art. Accordingly the foregoing description should be taken as illustrative and not in a limiting sense.

The invention claimed is:

1. A system for controlling warning devices mounted on a vehicle comprising:
    a plurality of warning devices each mounted on a vehicle for providing warning signals directed external of said vehicle;
    a controller for controlling operation of each of said plurality of warning devices, and said controller receives one or more vehicle event signals each indicative of occurrence of one of a plurality of different vehicle events associated with the vehicle having said mounted warning devices; and
    said controller responsive to receiving each of the vehicle event signals overrides operation of one or more of said warning devices from a normal operating mode into an override operating mode in accordance with the vehicle event associated with the vehicle event signal being received, wherein said vehicle event signals are independent of user activation into said normal operating mode of each of said plurality of warning devices that provide visual warning signals.

2. The system according to claim 1 wherein each of said warning devices has a cable which extends from the warning device to a connector, and said system further comprises a plurality of output ports in which each of said output ports is connectable to the connector of a different one of said warning devices.

3. The system according to claim 1 further comprising a plurality of input connectors each for receiving different ones of said vehicle event signals.

4. The system according to claim 1 wherein said controller responsive to receiving each of the vehicle event signals overrides operation of said one or more of said warning devices from said normal operating mode into said override operating mode in accordance with the vehicle event associated and further in accordance with position of each of said one or more warning devices along said vehicle.

5. The system according to claim 1 wherein said operation of said one or more of said warning devices in said override mode for at least one of said vehicle events operates to supplement activation of one or more pre-existing light indicators associated with said one of vehicle events along the vehicle, in which said one or more light indicators operate independent of said system.

6. The system according to claim 5 wherein other of said one or more warning lights are disabled in said override mode for said at least one of said vehicle events to avoid confusion with said one or more pre-existing light indicators.

7. The system according to claim 5 wherein at least one of said plurality of different vehicle events is braking of the vehicle, and said one or more pre-existing light indicators supplemented are rear tail lights of the vehicle when actuated to indicate braking.

8. The system according to claim 5 wherein at least one of said plurality of different vehicle events is right turn signal activation, and said one or more pre-existing light indicators supplemented is a flashing rear right turn signal light of the vehicle.

9. The system according to claim 8 and wherein at least another one of said plurality of different vehicle events is left turn signal activation, and said one or more pre-existing light indicators supplemented for said another one of said plurality of different vehicle events is a flashing rear left turn signal light of the vehicle.

10. The system according to claim 1 wherein at least one of said plurality of different vehicle events represent up or down status of a plow of said vehicle, and said one or more warning devices change in color of visual warning signals when in said override mode associated with said one of said plurality of different vehicle events representing up or down state of the plow.

11. The system according to claim 1 wherein at least one of said plurality of different vehicle events represent reverse gear shift, and said one or more warning devices provide audible warning signals in said override mode associated with one of said plurality of different vehicle events representing reverse gear shift.

12. The system according to claim 1 wherein in said normal mode each of warning devices providing visual warning signals is operated by said controller in a selected flash pattern and two or more of said warning devices providing visual warning signals are synchronized to operate in unison or alternate with each other.

13. The system according to claim 1 wherein said plurality of different vehicle events comprise braking, right turn signal activation, left turn signal activation, reverse gear shift, park signal activation, and door open.

14. The system according to claim 1 further comprising a light sensor mounted on the vehicle providing a signal representing of an amount or level of ambient light, and said controller operates said warning devices providing visual warning signals in low power or high power states in accordance with said signal representing of the amount or level of ambient light.

15. The system according to claim 1 further comprising a user interface to said controller enabling selection of at least one mode of operation of each of said warning devices in providing warning signals.

16. The system according to claim 1 wherein each of said one or more of said warning devices when in said override operating mode change in outputted warning signal in one or more of a visual pattern or audible tone.

17. The system according to claim 1 wherein said one or more of said warning devices are different from one or more pre-existing light indicators of the vehicle associated with the vehicle event signal being received.

18. The system according to claim 17 wherein said pre-existing light indicators are at least lamps along of the vehicle associated with braking, right turn, and left turn of the vehicle.

19. The system according to claim 1 wherein said controller responsive to detecting two or more of said vehicle event signals overrides said normal operation mode of one or more of said warning devices into said override operating mode in accordance with said two or more of said vehicle events associated with said two or more of said vehicle event signal being received.

20. A system for controlling warning devices mounted on a vehicle comprising:
a plurality of warning devices mountable along an exterior of a vehicle, each providing one or more of visual or audible warning outputs having selectable modes of operation;
a plurality of output ports in which each port is connected to one or more wires of a different one of said plurality of warning devices;
a plurality of input ports for receiving an actuation signal indicative of one of a plurality of different vehicle events which are independent of said operation of said warning devices and independent of user actuation into a normal operating mode of each of said warning devices that provide visual warning outputs;
a controller connected to each of said plurality of warning devices via said output port associated with the warning devices for controlling operation of said warning devices, said controller enables operation of each of said warning devices, and said controller responsive to receiving an actuation signal along one of said input ports overrides said operation of one or more of said warning devices into a selected override mode in accordance with the vehicle event associated with the received actuation signal.

21. The system according to claim 20 wherein at least said controller is on a printed circuit board contained within a housing.

22. The system according to claim 20 wherein said plurality of different vehicle events comprises two or more of braking, right turn signal activation, left turn signal activation, vehicle drive in reverse, park signal activation, and door open.

23. The system according to claim 20 further comprising a light sensor mounted on the vehicle, and said light sensor provides said controller signals representative of ambient light for use in determining high and lower power state operation of said warning devices.

24. A method for controlling warning devices mounted on a vehicle comprising the steps of:
mounting a plurality of warning devices along a vehicle for providing warning signals directed external of said vehicle;
providing a controller controlling operation of each of said plurality of warning devices;
receiving one or more vehicle event signals by said controller each indicative of occurrence of one of a plurality of different vehicle events associated with the vehicle having said mounted warning devices; and
overriding operation of one or more of the warning devices responsive to said controller receiving each of the vehicle event signals from a normal operating mode into an override operating mode in accordance with the vehicle event associated with the vehicle event signal being received, in which said vehicle event signals are independent of user activation into said normal operating mode of each of said plurality of warning device that provide visual warning signals.

* * * * *